3,310,137
FRICTION PARKING BRAKE
John R. Aurelia, Dearborn, and Roland E. Schultz, Utica, Mich., assignors to General Motors Corporation, Detroit, Mich., a corporation of Delaware
Filed July 26, 1965, Ser. No. 474,822
8 Claims. (Cl. 188—78)

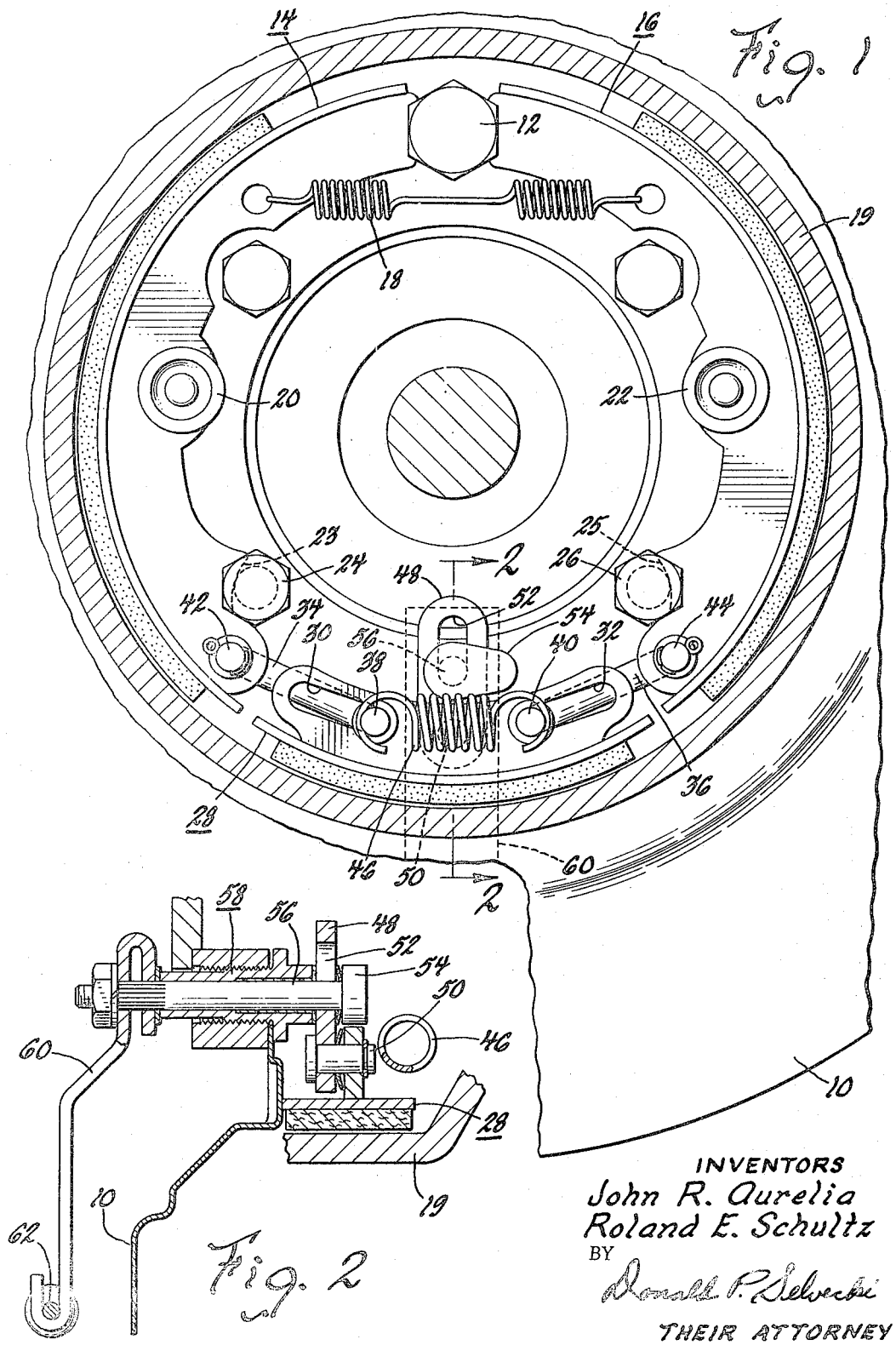

This invention relates to vehicle brakes and more particularly to a parking brake utilizing the servo action generated between brake shoes and a rotatable drum.

Parking brakes of common design generally utilize one of the brake shoes in a rear wheel to frictionally engage a rotatable drum. The servo action generated by a rotatable drum on a brake shoe causes a slight amount of rotation of the brake shoe in the direction of rotation of the drum. In a typical parking brake with a drum tending to rotate in a given direction, depending on which brake shoe is utilized for the mechanism, the shoe is driven by servo action toward a fixed anchor pin, thereby maintaining the brake in a actuated condition with essentially the same force as applied on an actuating cable. With this type of arrangement and the weight of the automobile tending to cause reverse rotation of the vehicle wheel, the brake shoe that is actuated will be drawn away from the anchor pin, thereby causing a lessening of the force acting against the rotatable drum.

It is an object of the present invention to provide an improved parking brake mechanism which utilizes the servo action generated by a brake drum to more firmly engage an actuated brake shoe with the rotatable drum, no matter in which direction the vehicle wheel has a tendency to rotate.

It is another object of the subject invention to provide an improved parking brake mechanism utilizing two secondary shoes and one primary shoe to create a firm frictional engagement between brake linings and a brake drum regardless of the direction of rotational tendency of a vehicle wheel.

It is still another object of the present invention to provide an improved parking brake mechanism which includes a primary shoe actuatable by a cam element in turn responsive to a pulling force on a brake cable in a conventional manner.

It is a further object of the present invention to provide an improved parking brake mechanism capable of carrying out the aforementioned objects in which the primary brake shoe is automatically centered with respect to the secondary brake shoes upon release of the parking brake.

Further objects and advantages of the present invention will be apparent from the following description, reference being had to the accompanying drawings wherein a preferred embodiment of the present invention are clearly shown.

In the drawings:

FIGURE 1 is an elevational view of the subject invention illustrated in a typical operative environment;

FIGURE 2 is a sectional view taken along line 2—2 of FIGURE 1;

Figure 3:
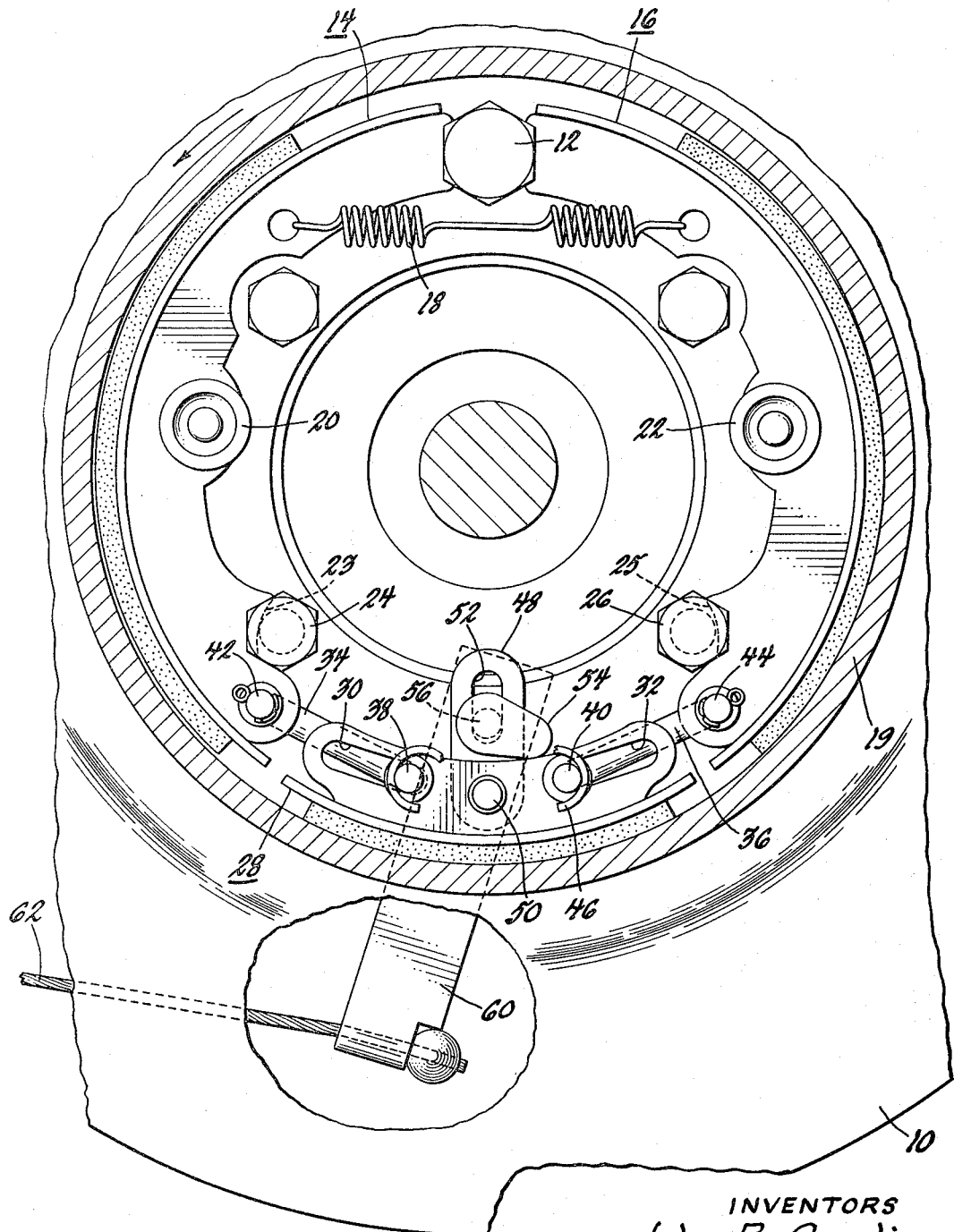
FIGURE 3 is an elevational view of the subject invention similar to the view of FIGURE 1 but with the brake mechanism shown in an actuated condition.

Referring to FIGURE 1, a typical parking brake handle in the driving compartment is provided to initiate a pulling force on a brake cable 62. A backing plate 10 is attached to a fixed portion of the vehicle and includes an anchor pin 12 fixed thereto. Upper opposed ends of secondary brake shoe assemblies 14 and 16 abut opposite sides of anchor pin 12. A spring 18 connecting the webs of the secondary shoe assemblies 14 and 16 maintain the upper ends of the shoes in biased engagement with anchor pin 12. Rotatable drum 19 is carried for rotation by a vehicle wheel in any well-known manner and is adaptable to be frictionally engaged by shoes 14 and 16 to provide a braking action.

Biased hold-down springs 20 and 22 are provided for each of the secondary shoes 14 and 16 and maintain the center portion of the webs in biased engagement with backing plate 10. The lower ends of the shoe assemblies 14 and 16 have notches 23 and 25 which engage secondary anchor pins 24 and 26, respectively.

A second brake shoe means or primary shoe assembly 28 is positioned in juxtaposition to brake drum 19 at a point opposite primary anchor pin 12. Second brake means 28 includes a web portion in which arcuate slots 30 and 32 extend generally circumferentially toward each end. U-shaped rods 34 and 36 have their adjacent ends 38 and 40, respectively, extending through slots 30 and 32 and their other ends 42 and 44 rotatably engaging holes in webs of the first brake shoe means 14 and 16 at the lower web ends. A retracting spring 46 hooks over the ends 38 and 40 of the rods and holds them in the position shown in FIGURE 1.

A link or guide means 48 is pivotally connected by a pin 50 through the center portion of the web of the second brake shoe means 28. A vertically extending slot 52 is provided in link 48. A cam 54 is mounted on rotatable shaft 56 carried for rotation by a bushing assembly 58 which is carried in turn by backing plate 10. Shaft 56 extends through slot 52 providing a guide means for the second brake shoe means during operative movement thereof. A lever 60, better seen in FIGURE 2, non-rotatably engages the end of rod 56 opposite cam 54 and engages the parking brake cable. Cable 62 operatively engages lever 60 in a manner providing for rotation thereof in response to axial movement of cable 62 brought about by a pulling of the cable responding to the pivoting of the parking brake lever.

Referring to FIGURE 1, when cable 62 is pulled, lever 60 connected to shaft 56 rotates in bushing 58. Cam 54, as seen in FIGURE 1, rotates with shaft 56 and acts on the inner surface of the web of shoe assembly 28 to move the shoe radially outward toward drum 19. This movement is guided by slot 52 in link 48. Rods 34 and 36 allow this movement since they tend to pivot in their respective slots 30 and 32 as well as in the openings in the first brake shoe means 14 and 16 through which they extend.

When the second brake shoe means 28 engages drum 19, assuming the vehicle to be moving in a manner causing counterclockwise rotation of drum 19, the second brake shoe means 28 will follow this counterclockwise movement. A mechanical servo action is therefore engendered which will be transmitted through rod 36 which drives first brake shoe means 16 pivotally on anchor pin 12 into frictional engagement with drum 19 into the position shown in FIGURE 3. Spring 46 will expand as the web of brake shoe 28 moves relative to end 38 of rod 34.

Upon brake release, return spring 46, previously expanded, now contracts and draws pins 38 and 40 close together guided by slot 52, thereby replacing all of the brake shoes in a poised position for subsequent actuation. It is understood that a similar action takes place as the vehicle is moving or tending to move the wheel in a clockwise direction except that, in that case, first brake shoe means 14 is energized rather than brake shoe means 16.

The utility of the subject invention is apparent in the environment of a vehicle parking brake. It is understood that the mechanism illustrated herein is particularly adaptable as a separate emergency or parking brake mechanism when used with vehicles equipped with disc brakes. The utility of the invention is further extended in that the subject mechanism is adaptable for use on vehicles equipped with conventional brakes as well as being easily adapted for mounting on the drive shaft of a vehicle on vehicles having a transmission type parking brake. The salient feature of the present invention is the operation of the device in response to a camming action that then utilizes servo action generated between relatively moving parts in an advantageous manner bringing about even more positive braking. Therefore, the subject invention utilizes a force normally acting detrimentally in parking brake mechanisms in a manner creating an advantage to increase a braking force.

While the embodiment of the present invention, as herein disclosed, constitutes a preferred form, it is to be understood that other forms might be adopted.

What is claimed is as follows:

1. A vehicle brake mechanism comprising: backing plate means including an anchor pin carried by a fixed portion of a vehicle; first brake shoe means carried by said backing plate means and pivotable on said anchor pin; a rotatable brake drum carried by a vehicle wheel and juxtaposed to said first brake shoe means; second brake shoe means drivably linked to said first brake shoe means and being responsive to a servo action created by said rotating drum to move said first brake shoe means into said rotating drum; and actuating means having a pivot support carried by said backing plate means, said actuating means including guide means at least one portion of which is pivotally carried by said second brake shoe means and another portion is slotted for directionally controlling an input force by said actuator means whereby said second brake shoe means is moved by a servo action generated by contact therebetween and the rotating drum to move in turn said first brake shoe means.

2. A vehicle brake mechanism according to claim 1 wherein said first brake shoe means is a pair of brake shoes, at least one of which is pivotable on said anchor pin during a brake actuation and said second brake shoe means is a single independent brake movable into the rotating drum by said actuating means and moving in response to a servo action into one of said first brake shoe means to cause a frictional engagement thereof with the rotating drum.

3. A vehicle brake mechanism according to claim 1 wherein said first brake shoe means is drivably linked to said second brake shoe means by linking means comprising: a pair of arcuate slots formed in the web of said second brake shoe means, a pair of link rods engaging said arcuate slots and ends of said first brake shoe means opposite from the end pivotable on said anchor pin, and spring means engaging ends of said link rods drawing said link rods to one extreme end of said arcuate slots thereby providing a direct link to one of said first brake shoe means and a lost motion connection to the other of said first brake shoe means as said second brake shoe means moves in response to a servo action generation during a brake actuation.

4. A vehicle brake mechanism according to claim 1 wherein said actuating means comprises: a bushing carried by said backing plate, a shaft rotatably carried by said bushing and having first and second ends, a first end engaged by a lever adapted to rotate said shaft, a second end hvaing a cam member formed therewith and engageable with said second brake shoe means, said shaft engaging said guide means thereby directing the force from the lever rotating said shaft to said second brake shoe means for actuation of the vehicle brakes.

5. A vehicle brake mechanism for use with a cable operated hand brake, said mechanism comprising: a rotatable drum carried by a wheel of a vehicle; first brake shoe means carried by a fixed portion of the vehicle in juxtaposition to said rotatable drum; a backing plate carried by a fixed portion of the vehicle and including an anchor pin against which first opposed ends of said first brake shoe means are normally pivotable; second brake shoe means including guide means pivotably and slidably carried between second opposed ends of said first brake shoe means, said second brake shoe means having arcuate shaped slots formed therein; linking means pivotably engaging said first brake shoe means and slidable in said slots in said second brake shoe means to form a driving connection therebetween; and actuating means carried by said backing plate and including cam means engageable with said second brake shoe means to slide said second brake shoe means into frictional engagement with said rotatable drum, said frictional engagement causing said second brake shoe means to pivot in the direction of rotation of said rotatable drum thereby driving said linking means and moving one of said first brake shoe means pivotally on said anchor pin into frictional engagement with said rotatable drum to engender a braking action.

6. A vehicle brake mechanism according to claim 5 wherein said linking means are biased toward juxtaposed ends of said slots by spring means.

7. A vehicle brake mechanism according to claim 5 wherein said actuating means includes a bushing carried by said backing plate, a shaft rotatable in said bushing and having two operative ends, a first of said ends engageable by a lever connected to an actuating cable, and a second of said ends disposed in said guide means of said second brake shoe means and carrying said cam means, said lever rotating said shaft in said bushing and in said guide means to cam said second brake shoe means into said rotatable drum.

8. A vehicle brake mechanism according to claim 5 wherein said guide means is an elongated loop closed at both ends and pivotally supported by the web portion of said second brake shoe means.

References Cited by the Examiner

UNITED STATES PATENTS

| | | | |
|---|---|---|---|
| 1,660,136 | 2/1928 | Renaux | 188—78 X |
| 1,776,954 | 9/1930 | Sanford | 188—78 X |

MILTON BUCHLER, *Primary Examiner.*

B. S. MOWRY, *Examiner.*